(12) United States Patent
Nakagawa et al.

(10) Patent No.: US 6,414,691 B1
(45) Date of Patent: Jul. 2, 2002

(54) METHOD AND APPARATUS FOR DISPLAYING GRAPHS

(75) Inventors: Masayuki Nakagawa, Itikawa; Yukiko Norichika, Kawasaki; Takeshi Yokota; Osamu Kubo, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/492,080

(22) Filed: Jan. 27, 2000

(30) Foreign Application Priority Data

Nov. 11, 1999  (JP) ............................................ 11-320802

(51) Int. Cl.[7] .............................................. G06T 11/00
(52) U.S. Cl. ............................ 345/619; 345/440; 705/7
(58) Field of Search ................................ 345/440, 619, 345/636, 639, 440.2, 441, 689, 850, 848, 849; 707/6, 513, 103 R, 514, 515, 516; 705/7, 400, 36

(56) References Cited

U.S. PATENT DOCUMENTS

| | | | | |
|---|---|---|---|---|
| 5,371,675 A | * | 12/1994 | Greif et al. ................. | 707/503 |
| 5,657,453 A | * | 8/1997 | Taoka ............................. | 705/1 |
| 5,669,007 A | * | 9/1997 | Tateishi ....................... | 707/517 |
| 5,696,981 A | * | 12/1997 | Shovers ....................... | 704/10 |
| 5,701,400 A | * | 12/1997 | Amado ......................... | 706/45 |
| 6,014,633 A | * | 1/2000 | DeBusk et al. ................ | 705/7 |
| 6,032,125 A | * | 2/2000 | Ando ........................... | 705/10 |
| 6,295,464 B1 | * | 9/2001 | Metaxas ..................... | 600/407 |

FOREIGN PATENT DOCUMENTS

| | | |
|---|---|---|
| JP | A-10-111950 | 4/1998 |
| JP | A-11-39128 | 2/1999 |

* cited by examiner

Primary Examiner—Matthew Luu
Assistant Examiner—Thu-Thao Havan
(74) Attorney, Agent, or Firm—Antonelli, Terry, Stout & Kraus, LLP

(57) ABSTRACT

In a graph displaying method for displaying as an analysis subject a collection of constituent members each having a plurality of information parameters, each information parameter of each constituent member is assigned to a display attribute of graphic representation, and a value of the information parameter of each constituent member is converted into a value of the assigned display attribute. Next, a display corresponding to the information parameter of each constituent member is provided by using the converted display attribute value. Then, the value of each information parameter indicating affiliation between constituent members is converted into the display attribute value of a display element which couples display elements of the constituent members, and a display corresponding to the affiliation between the constituent members is provided by using the converted display attribute value.

10 Claims, 18 Drawing Sheets

FIG. 4

| MEMBER | MEMBER DISCRIMINATION INFORMATION | AFFILIATED COMPANY GROUP | MEMBER HIERARCHICAL LEVEL | AFFILIATED COMPANY GROUP NUMBER | LOWEST HIERARCHICAL LEVEL OF MEMBER |
|---|---|---|---|---|---|
| GROUP A | GROUP | — | 1 | 0 | 3 |
| COMPANY 1 | COMPANY | GROUP A | 1 | 1 | 3 |
| COMPANY 1-1 | COMPANY | GROUP A | 2 | 1 | 2 |
| GROUP Aa | GROUP | GROUP A | 2 | 1 | 3 |
| COMPANY 1-2 | COMPANY | GROUP Aa | 2 | 2 | 3 |
| COMPANY 1-2-1 | COMPANY | GROUP Aa | 3 | 2 | 3 |
| COMPANY 1-2-2 | COMPANY | GROUP Aa | 3 | 2 | 3 |
| COMPANY 2 | COMPANY | GROUP A | 1 | 1 | 1 |
| .. | .. | .. | .. | .. | .. |

| MEMBER / 401 | AFFILIATED MEMBER / 402 | INVESTMENT RATIO / 403 | TRANSACTION RATIO / 404 | OFFICER DELEGATION RATIO / 405 | ... / 406 |
|---|---|---|---|---|---|
| COMPANY 1 | COMPANY 1-1 | 60% | 60% | 60% | ... |
| COMPANY 1 | COMPANY 1-2 | 50% | 50% | 50% | ... |
| COMPANY 1-2 | COMPANY 1-2-1 | 50% | 50% | 50% | ... |
| COMPANY 1-2 | COMPANY 1-2-2 | — | — | — | ... |
| COMPANY 2 | — | ... | ... | ... | ... |

FIG. 6

| MEMBER 501 | TRANSACTION VOLUME 502 | RISK LEVEL 503 | PROFIT VOLUME 504 | ROE 505 | ROA 506 | ... 507 |
|---|---|---|---|---|---|---|
| GROUP A | | | | | | ... |
| COMPANY 1 | | | | | | ... |
| COMPANY 1-1 | | | | | | ... |
| GROUP Aa | | | | | | ... |
| COMPANY 1-2 | | | | | | ... |
| COMPANY 1-2-1 | | | | | | ... |
| COMPANY 1-2-2 | | | | | | ... |
| COMPANY 2 | | | | | | ... |
| .. | | | | | | |

FIG. 7

| MEMBER 601 | SALES VOLUME 602 | ORDINARY REVENUE 603 | ORDINARY REVENUE RATE 604 | ROE 605 | ROA 606 | 607 |
|---|---|---|---|---|---|---|
| GROUP A | | | | | | ... |
| COMPANY 1 | | | | | | ... |
| COMPANY 1-1 | | | | | | ... |
| GROUP Aa | | | | | | ... |
| COMPANY 1-2 | | | | | | ... |
| COMPANY 1-2-1 | | | | | | ... |
| COMPANY 1-2-2 | | | | | | ... |
| COMPANY 2 | | | | | | ... |
| ... | | | | | | |

FIG. 8

| DISPLAY ITEM 701 | CORRESPONDING INFORMATION 702 |
|---|---|
| X COORDINATE | TRANSACTION VOLUME |
| Y COORDINATE | PROFIT AMOUNT |
| Z COORDINATE | RISK LEVEL |
| SPHERE RADIUS | SALES AMOUNT |
| SPHERE COLOR | ORDINARY REVENUE RATE |
| COLUMN RADIUS | INVESTMENT RATIO |
| FLASH | RISK CHANGE (INCREASE/DECREASE) |

FIG. 9

| COLOR RANGE 801 | CORRESPONDING COLOR 802 |
|---|---|
| COLOR INFORMATION PARAMETER < 0 % | BLUE |
| 0% ≤ COLOR INFORMATION PARAMETER < 5 % | SKY BLUE |
| 5% ≤ COLOR INFORMATION PARAMETER < 10 % | GREEN |
| 10% ≤ COLOR INFORMATION PARAMETER < 20 % | YELLOWISH GREEN |
| 20% ≤ COLOR INFORMATION PARAMETER < 30 % | YELLOW |
| 30% ≤ COLOR INFORMATION PARAMETER < 50 % | ORANGE |
| 50% ≤ COLOR INFORMATION PARAMETER | RED |

| FLASH DECISION RANGE 901 | CORRESPONDING FLASH INTERVAL 902 |
|---|---|
| FLASH INFORMATION PARAMETER CHANGE < 0 % | NO FLASH |
| 0% ≤ FLASH INFORMATION PARAMETER CHANGE < 5 % | 2.0sec |
| 5% ≤ FLASH INFORMATION PARAMETER CHANGE < 10 % | 1.5sec |
| 10% ≤ FLASH INFORMATION PARAMETER CHANGE < 20 % | 1.0sec |
| 20% ≤ FLASH INFORMATION PARAMETER CHANGE < 50 % | 0.5sec |
| 50% ≤ FLASH INFORMATION PARAMETER CHANGE | 0.2sec |

FIG. 11

| MEMBER | MEMBER DISCRIMINATION INFORMATION | X VALUE | Y VALUE | Z VALUE | SPHERE RADIUS | SPHERE COLOR | FLASH INFORMATION |
|---|---|---|---|---|---|---|---|
| GROUP A | GROUP | | | | 100 | BLUE | NO FLASH |
| COMPANY 1 | COMPANY | | | | 80 | BLUE | NO FLASH |
| COMPANY 1-1 | COMPANY | | | | 50 | BLUE | NO FLASH |
| GROUP Aa | GROUP | | | | 90 | SKYBLUE | NO FLASH |
| COMPANY 1-2 | COMPANY | | | | 70 | SKYBLUE | 2.0sec |
| COMPANY 1-2-1 | COMPANY | | | | 20 | SKYBLUE | 2.0sec |
| COMPANY 1-2-2 | COMPANY | | | | 10 | SKYBLUE | 2.0sec |
| COMPANY 2 | COMPANY | | | | 60 | GREEN | 0.2sec |

| MEMBER 1101 | AFFILIATED MEMBER 1102 | COLUMN RADIUS 1103 |
|---|---|---|
| COMPANY 1 | COMPANY 1-1 | 40 |
| COMPANY 1 | COMPANY 1-2 | 35 |
| COMPANY 1-2 | COMPANY 1-2-1 | 10 |
| COMPANY 1-2 | COMPANY 1-2-2 | 5 |
| COMPANY 2 | — | — |

METHOD AND APPARATUS FOR DISPLAYING GRAPHS

BACKGROUND OF THE INVENTION

The present invention relates to a graph displaying apparatus for displaying an analysis subject having a plurality of information parameters, in graphic representation, and more particularly to techniques to be effectively applied to a graph displaying apparatus for displaying an analysis subject having a plurality of information parameters regarding business management, in 3-D (dimension) graphic representation.

Conventionally, the values of a plurality of information parameters of an analysis subject, a plurality of information parameters defining correlation between analysis subjects, and a change ratio of a current value to a past reference value of each information parameter, have been grasped and confirmed by using a 2-D matrix. The information parameter defining the degree of affiliation between analysis subjects has been grasped and confirmed by using another 2-D matrix different from the above-mentioned 2-D matrix.

A 3-D graph displaying apparatus and its storage medium are described in JP-A-10-111950, in which data of display subjects and 3-D data collected for each common item designated by a display attribute are generated to provide a display of 3-D representation and make it easy to visually confirm the correlation between display subjects.

A graphic display method is described in JP-A-11-39128, in which a plurality of optional information parameters are displayed in predetermined shapes to make it easy to compare and evaluate the information parameters through visual grasp and recognition.

SUMMARY OF THE INVENTION

According to the conventional techniques, of a plurality of information parameters of an analysis subject, correlation between optional two information parameters is grasped and confirmed by representing the parameter values as numerical values of a 2-D matrix. It is therefore difficult to visually grasp and confirm the correlation. This is also the same for the case that information parameters of an analysis subject are grasped in connection with a change ratio of a current value to a past reference value of each parameter.

It is possible to use a 2-D matrix for disassembling an analysis subject collection having information parameters into a plurality of analysis subjects constituting the collection or for assembling a plurality of constituent analysis subjects into an analysis subject collection. However, since numerical values are used for disassemble and assemble, it is difficult to visually grasp and confirm. It is also difficult to grasp and confirm at the same time the information parameter defining an affiliation degree of analysis subjects.

It is an object of the present invention to solve the above-described problems and provide techniques capable of visually and collectively grasping and confirming correlation between information parameters of analysis subjects, a change (increase/decrease) in a particular information parameter, a relative position of each analysis subject belonging to an analysis subject collection, an influence degree of a particular information parameter of each analysis subject upon the analysis subject collection.

According to the present invention, a graph displaying apparatus for displaying as an analysis subject a collection of a plurality of constituent members each having a plurality of information parameters, provides a display of graphic representation, in the same coordinate space, of information parameters of each analysis subject, an information parameter defining the affiliation degree between analysis subjects, a change ratio of a current value to a past reference value of each information parameter, and disassembled or assembled information parameters.

The graph displaying apparatus of the invention first assigns each information parameter of a constituent member constituting a collection to display attributes such as graph display coordinate values, the shape, size, color and the like of each display element. The value of each information parameter of each constituent member is converted into a value of the assigned display attribute through proper scaling, and thereafter, the information parameter of each constituent member is displayed by using the converted display attribute value.

In displaying affiliation between constituent members, the value of each information parameter defining the affiliation between constituent members is converted into the display attribute value of a display element which couples display elements of the constituent members, and the affiliation between the constituent members is displayed by using the converted display attribute value.

In displaying a change in a particular information parameter of each constituent member, the display attribute value corresponding to the information parameter is changed in accordance with a change in the particular information parameter, and the information parameter change is displayed by using the changed display attribute value.

In displaying constituent members by disassembling a collection or in displaying a collection by assembling constituent members, the value of each information parameter of each constituent member at a corresponding disassemble/assemble hierarchical level is converted into a value of the assigned display attribute, and the information parameter of each constituent member is displayed by using the converted display attribute values.

As above, the graph displaying apparatus of this invention provides a display of graphic representation, in the same coordinate space, of information parameters of each analysis subject, an information parameter defining the affiliation degree between analysis subjects, a change ratio of a current value to a past reference value of each information parameter, and disassembled or assembled information parameters. It is therefore possible to visually and collectively grasp and confirm correlation between information parameters of analysis subjects, a change in a particular information parameter, a relative position of each analysis subject belonging to an analysis subject collection, an influence degree of a particular information parameter of each analysis subject upon the analysis subject collection.

BRIEF DESCRIPTION OF THE DRAWINGS

FIG. 4 is a diagram showing an example of a member management table according to the embodiment.

FIG. 5 is a diagram showing an example of a company relation information table according to the embodiment.

FIG. 6 is a diagram showing an example of a member transaction table according to the embodiment.

FIG. 7 is a diagram showing an example of a member business information table according to the embodiment.

FIG. 8 is a diagram showing an example of a display information definition table according to the embodiment.

FIG. 9 is a diagram showing an example of a color information definition table according to the embodiment.

FIG. 11 is a diagram showing an example of a 3-D graphic sphere information table according to the embodiment.

FIG. 12 is a diagram showing an example of a 3-D graphic column information table according to the embodiment.

DETAILED DESCRIPTION OF THE EMBODIMENTS

A graph displaying apparatus according to an embodiment will be described, which apparatus displays a collection of constituent members each having a plurality type of information parameters, as analysts subjects.

Figure 1:
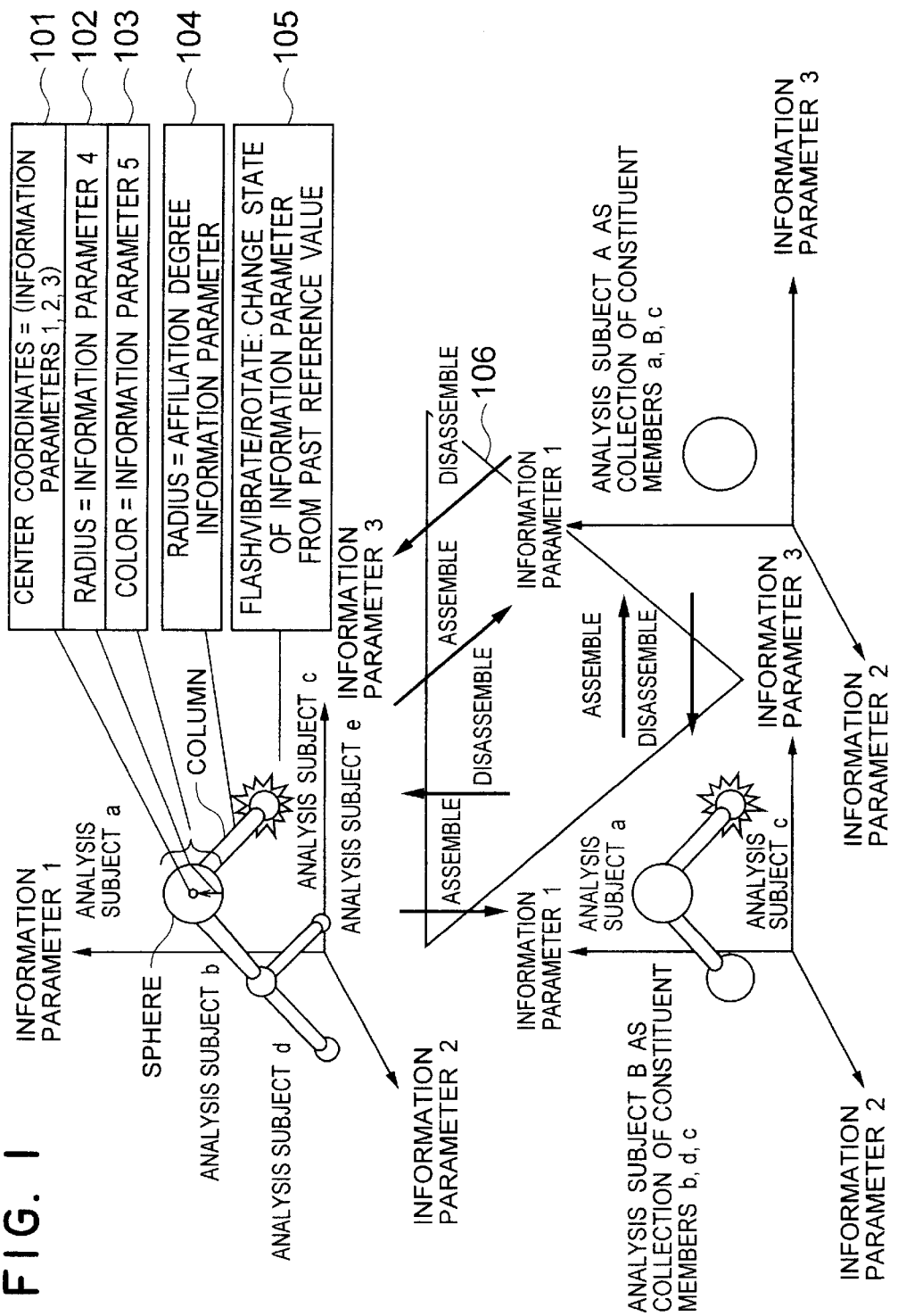
FIG. 1 is a schematic diagram illustrating the outline of a method of displaying a 3-D graph according to an embodiment of the invention.

FIG. 1 is a schematic diagram illustrating the outline of a method of displaying a 3-D graph according to an embodiment of the invention. FIG. 1 illustrates the outline of a method of displaying an analysis subject in 3-D graphic representation. In the graph displaying apparatus of this embodiment, as shown in a display attribute assignment example 101, any of three information parameters among a plurality type of information parameters are used as X-, Y-, and X-axis coordinate values.

As shown in a display attribute assignment example 102 of FIG. 1, any of one information parameter among the plurality of information parameters, excepting the three information parameters used as the X-, Y-, and X-axis coordinate values, is used as a radius of a sphere having its center represented by the coordinate values.

As shown in a display attribute assignment example 103 of FIG. 1, any of one information parameter among the plurality of information parameters, excepting the four information items used as the X-, Y-, and X-axis coordinate values and the sphere radius, is used as a color of the sphere.

With these settings, each analysis subject can be drawn in a 3-D space, representing five information parameters among the plurality of information parameters of the analysis subject.

As shown in a display attribute assignment example 104 of FIG. 1, an information parameter which defines the degree of affiliation between two analysis subjects among a plurality of analysis subjects displayed in the 3-D space, is represented by the radius of a column having as its center axis a straight line interconnecting the centers of two spheres of the two analysis subjects. Each analysis subject can therefore be coupled to another related analysis subject.

As shown in a display attribute assignment example 105 of FIG. 1, upon instruction from a user, a current value of one of the five information parameters displayed on the screen is compared with a past reference value under additional management, and if a change (increase/decrease) ratio of the current value to the past reference value exceeds a change limit value preset by the user, then the sphere is flashed, vibrated or rotated.

It is assumed that a user designates the five information parameters including the three information parameters of X-, Y- and Z-axes, one information parameter of the sphere radius, and the information parameter for the flashing purpose.

As shown in a disassemble/assemble example 106 of FIG. 1, upon instruction from a user, a plurality of analysis subjects radially or hierarchically coupled by columns are assembled and relocated, or conversely, assembled analysis subjects are disassembled into a plurality of analysis subjects or constituent members radially or hierarchically coupled by columns.

Figure 2:
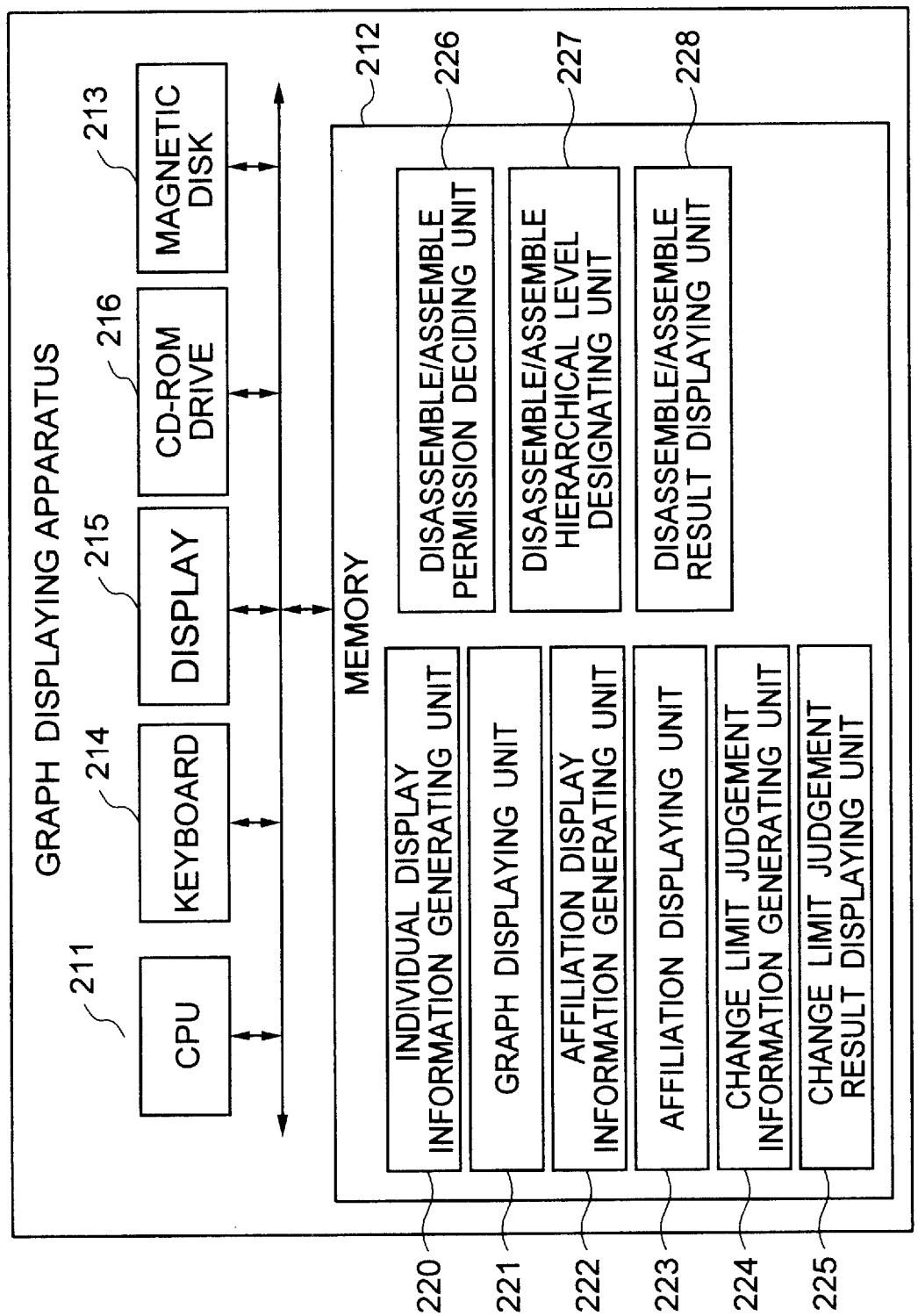
FIG. 2 is a block diagram showing the outline structure of a graph displaying apparatus according to an embodiment.

FIG. 2 is a block diagram showing the outline

The individual display information generating unit 220 assigns each information parameter of each constituent member to a display attribute for graphic representation, and converts the value of the information parameter of the constituent member into the value of the assigned display attribute. The graph displaying unit 221 displays an image corresponding to the information parameter of each constituent member, by using the converted display attribute values.

The affiliation display information generating unit 222 converts the value of an information parameter representative of the affiliation degree between constituent members into the display attribute value of a display element coupling the display elements of two constituent members. The affiliation displaying unit 223 displays an image corresponding to the affiliation between two constituent members by using the converted display attribute values.

The change limit judgement information generating unit 224 changes the display attribute value corresponding to an information parameter of each constituent member in accordance with a change in the information parameter. The change limit judgement result displaying unit 225 displays an image corresponding to the information parameter by using the changed display attribute values.

The disassemble/assemble permission deciding unit 226 decides whether the values of information structure of a graph displaying apparatus of the embodiment. As shown in FIG. 2, the graph displaying apparatus of this embodiment has a CPU 211. a memory 212, a magnetic disk drive 213, a keyboard 214, a display 215 and a CD-ROM drive 216.

CPU 211 controls the whole operation of the graph displaying apparatus. The memory 212 stores various programs and data in order to control the whole operation of the graph displaying apparatus. The magnetic disk drive 213 has a disk for storing various programs and data.

The keyboard 214 is used for entering various inputs in order to display a collection of constituent members each having a plurality type of information parameters, as display subjects. The display 215 displays as analysis subjects a collection of constituent members in 3-D graphic representation. The CD-ROM drive 216 has a CD-ROM which stores various programs.

The graph displaying apparatus also has an individual display information generating unit 220, a graph displaying unit 221, an affiliation display information generating unit 222, an affiliation displaying unit 223, a change limit judgement information generating unit 224, a change limit judgement result displaying unit 225, a disassemble/assemble permission deciding unit 226, a disassemble/assemble hierarchical level designating unit 227 and a disassemble/assemble result displaying unit 228. parameters of a selected constituent member can be disassembled or assembled. The disassemble/assemble hierarchical level designating unit 227 designates the hierarchical level of the constituent member capable of being disassembled or assembled.

The disassemble/assemble result displaying unit 228 converts the value of the information parameter of the constituent member at the designated hierarchical level, into the value of the assigned display attribute, and displays the image corresponding to the disassembled or assembled hierarchical level by using the converted display attribute value.

It is assumed that the programs for realizing the functions of the individual display information generating unit 220, graph displaying unit 221, affiliation display information generating unit 222, affiliation displaying unit 223, change limit judgement information generating unit 224, change limit judgement result displaying unit 225, disassemble/assemble permission deciding unit 226, disassemble/assemble hierarchical level designating unit 227 and disassemble/assemble result displaying unit 228, are stored in a storage medium such as a CD-ROM disk, loaded in a magnetic disk or the like, and then loaded in the memory to be executed. The storage medium for storing the programs may be other storage media different from a CD-ROM disk.

Figure 3:
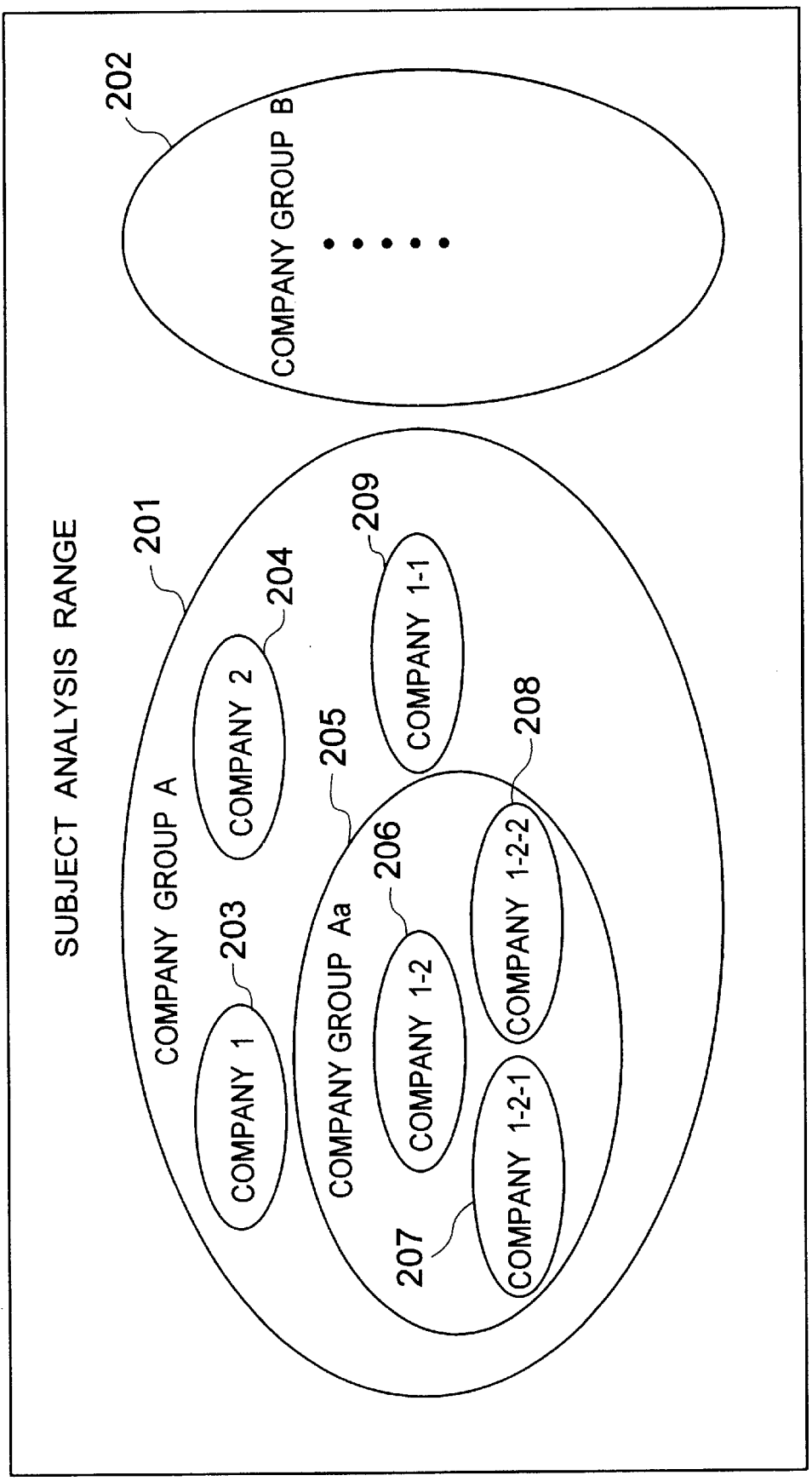
FIG. 3 is a diagram showing an example of the configuration of companies and company groups according to the embodiment.

FIG. 3 is a diagram showing an example of the configuration of companies and company groups according to the embodiment. The configuration shown in FIG. 3 has analysis subjects 201 to 209 including companies and company groups each constituting a collection of companies as its constituent members.

In this example, the analysis subject range contains highest hierarchical level business groups A and B. The business group A has, as its constituent members, a company 1, a company 2, a subsidiary company group Aa and a company 1-1. The subsidiary company group As has, as its constituent members, a company 1-2, a company 1-21 and a company 1-2-2.

Generally, the numbers of highest hierarchical level company groups, and companies and subsidiary company groups constituting the constituent members of each highest hierarchical level company group, are not limited. In this example, although the companies and the company groups constituted of companies are used as analysis subjects, other members may also be used in this embodiment, such as business lines of a company and business line groups each constituted of business lines, product lines and product line groups each constituted of product lines.

FIG. 4 shows an example of a member management table to be used for the configuration management of companies and company groups each constituted of companies.

A member 301 indicates a company or a company group constituted of companies. Company/group discrimination information 302 discriminates between a company and a group contained in the member 301. An affiliated company group 303 indicates a company group to which the member 301 is directly affiliated.

A member level 304 indicates the hierarchical level of each member 301 relative to the highest level. An affiliated company group number 305 indicates the number of company groups to which the member 301 is affiliated. A lowest affiliated member level 306 indicates the lowest hierarchical level of the member 301 which is affiliated to the highest level company group. It is assumed that this table is preset by a user by using an input screen or the like.

FIG. 5 shows an example of a company affiliation information table according to the embodiment, which table is used to manage the affiliation indices representative of the degree of affiliation between companies in the analysis subject range.

A member 401 indicates a company. An affiliated member 402 indicates a company which is affiliated to the member 401 in accordance with the affiliation indices such as an investment ratio 403, a transaction ratio 404, an officer delegation ratio 405 and the like. The investment ratio 403 indicates an investment state between companies. The transaction ratio 404 indicates a transaction state between companies. The officer delegation ratio 405 indicates an officer delegation state between companies. Other indices 406 indicate the states between companies, excepting the investment ratio 403, transaction ratio 404 and officer delegation ratio 405. It is assumed that this table is under additional management and data is stored in advance.

FIG. 6 shows an example of a member transaction information table according to the embodiment, which table manages the transaction states of companies and company groups each constituted of companies.

A member 501 indicates a company or a company group constituted of companies. A transaction volume 502 indicates a transaction scale of the member 501. A risk level 503 indicates a risk level of transactions of the member 501. A profit volume 504 indicates the profit scale of transactions of the member 501. An ROE 505 indicates profitability of transactions of the member 501. An ROA 506 also indicates profitability of transactions of the member 501. Other indices 507 indicate the transaction states between companies or between companies and company groups, excepting the transaction volume 502, risk level 503, profit volume 504, ROE 505 and ROA 506. It is assumed that the member transaction information table is time sequentially managed by another system and data is stored in advance.

FIG. 7 shows an example of a member business information table according to the embodiment, which table is used for managing the business of companies and company groups each constituted of companies.

A member 601 indicates a company or a company group constituted of companies. A sales amount 602 indicates. a business stable of the member 601. Ordinary revenue 603 indicates a revenue scale of the business of the member 601. An ordinary revenue rate 604 indicates profitability of the business of the member 601. An ROE 605 indicates profitability of the business of the member 601. An ROA 606 also indicates profitability of the business of the member 601. Other indices 607 indicate the business states between companies or between companies and company groups, excepting the sales amount 602, ordinary revenue 603, ordinary revenue rate 604, ROE 605 and ROA 606. It is assumed that the member business information table is time sequentially managed by another system and data is stored in advance.

The member transaction information table of FIG. 6 and the member business information table of FIG. 7 may be integrated as a single table, without using discrete tables.

FIG. 8 shows an example of a display information definition table according to the embodiment, which table is used to define the information parameters of companies and company groups to be displayed in 3-D representation.

A display item 701 indicates a display item necessary for 3-D representation. Corresponding information 702 indicates an information parameter of the company or company group constituted of companies corresponding to the display item 701.

It is assumed that this display information table is preset by a user. A plurality of display information tables may be managed by another system. In this case., it is possible to selectively use one display information definition table among a plurality of tables for graphic display purpose.

FIG. 9 shows an example of a color decision information table which defines the decision rules for deciding the color of a sphere to be displayed in 3-D representation.

A color range 801 indicates a stepwise range of each color information parameter. A corresponding color 802 indicates a color corresponding to each color range. It is assumed that this color decision information table is preset by a user.

Figure 10:
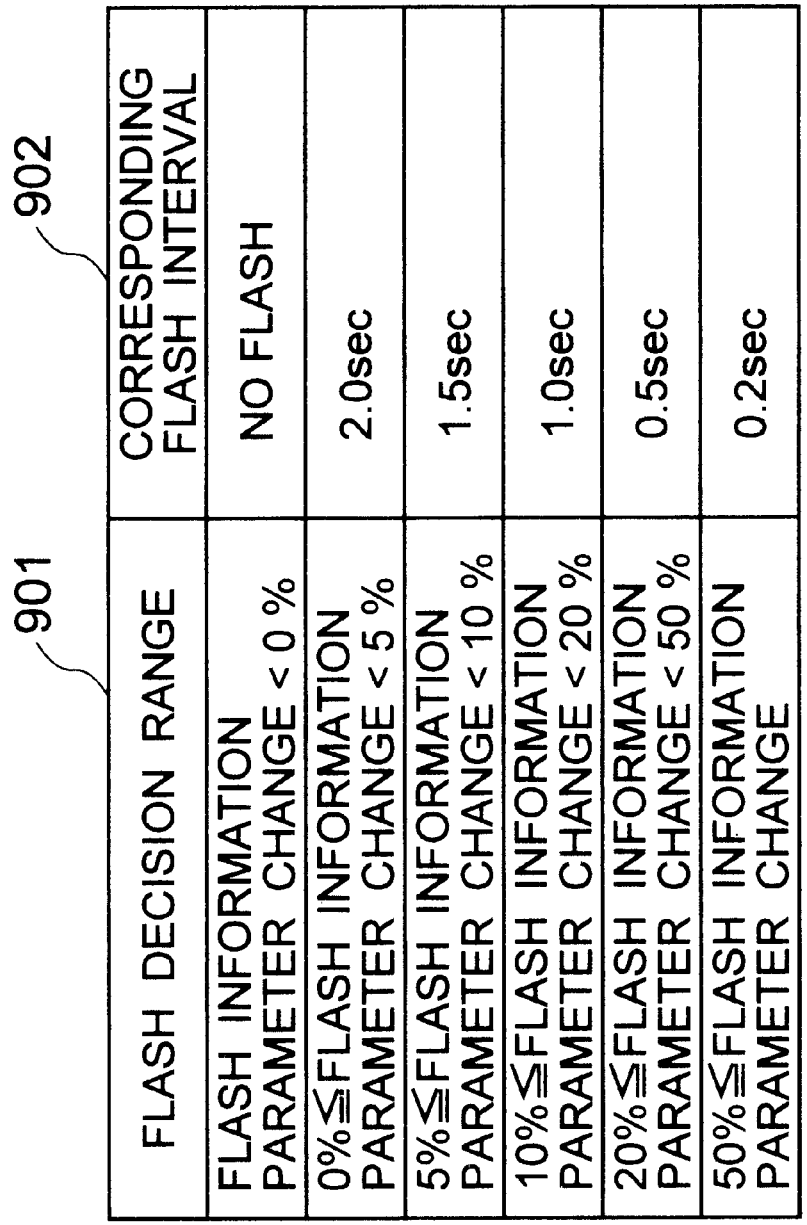
FIG. 10 is a diagram showing an example of a flashing information definition table according to the embodiment.

FIG. 10 shows an example of a flash decision information table according to the embodiment. This table of FIG. 10 will be described by taking as an example the case wherein a sphere is flashed, which is one method of indicating a change ratio of the past reference value relative to a current value of one of the corresponding information parameters shown in the corresponding information 702 of the display information definition table of the embodiment shown in FIG. 8. In this example, the flash decision information table shown in FIG. 10 defines the conditions of whether the sphere in 3-D representation is flashed or the conditions of determining the flash interval. These conditions correspond to change limit values described earlier.

In this flash decision table, change limit values are set stepwise. A flash decision range 901 indicates a stepwise range of the information parameters corresponding to sphere flashing and flash intervals. A corresponding flash interval 902 indicates no flashing or a flash interval corresponding to the flash decision range 901.

It is assumed that this flash decision information table is preset by a user. In this example, the sphere is flashed as a method of indicating the change ratio of the information parameter relative to each change limit value. Instead, other method may also be used, such as vibrating or rotating the sphere. In this case, the flash interval is replaced by the amplitude of vibration or the velocity of rotation.

FIG. 11 is a diagram showing an example of a 3-D graphic sphere information table according to the embodiment. This table is used for managing the information necessary for displaying a sphere in 3-D representation, and is formed by the system in accordance with the member management table of FIG. 4, member transaction information table of FIG. 6, member business information table of FIG. 7, display information definition table of FIG. 8, color decision information table of FIG. 9, and flash decision information table of FIG. 10.

A member 1001 indicates a company or a company group constituted of companies. Member discrimination information 1002 indicates whether the member 1001 is a company or a company group. An X value 1003 indicates the values of X-coordinates corresponding to the member 1001. A Y value 1004 indicates the values of Y-coordinates corresponding to the member 1001. A Z value 1005 indicates the values of Z-coordinates corresponding to the member 1001. A sphere radius 1006 indicates the radius of the sphere corresponding to the member 1001. A sphere color 1007 indicates the color of the sphere corresponding to the member 1001. Flash information 1008 indicates decision information whether the sphere corresponding to the member 1001 is to be flashed.

FIG. 12 is a diagram showing an example of a 3-D graphic column information table according to the embodiment. This table is used for managing the information necessary for displaying a column in 3-D representation, and is formed by the system in accordance with the member management table of FIG. 4, company affiliation information table of FIG. 5, and display information definition table of FIG. 8.

A member 1101 indicates a company. An affiliated member 1102 indicates a company affiliated by the member 1101. A column radius 1103 indicates the radius of a column corresponding to the member 1101.

Figure 13:
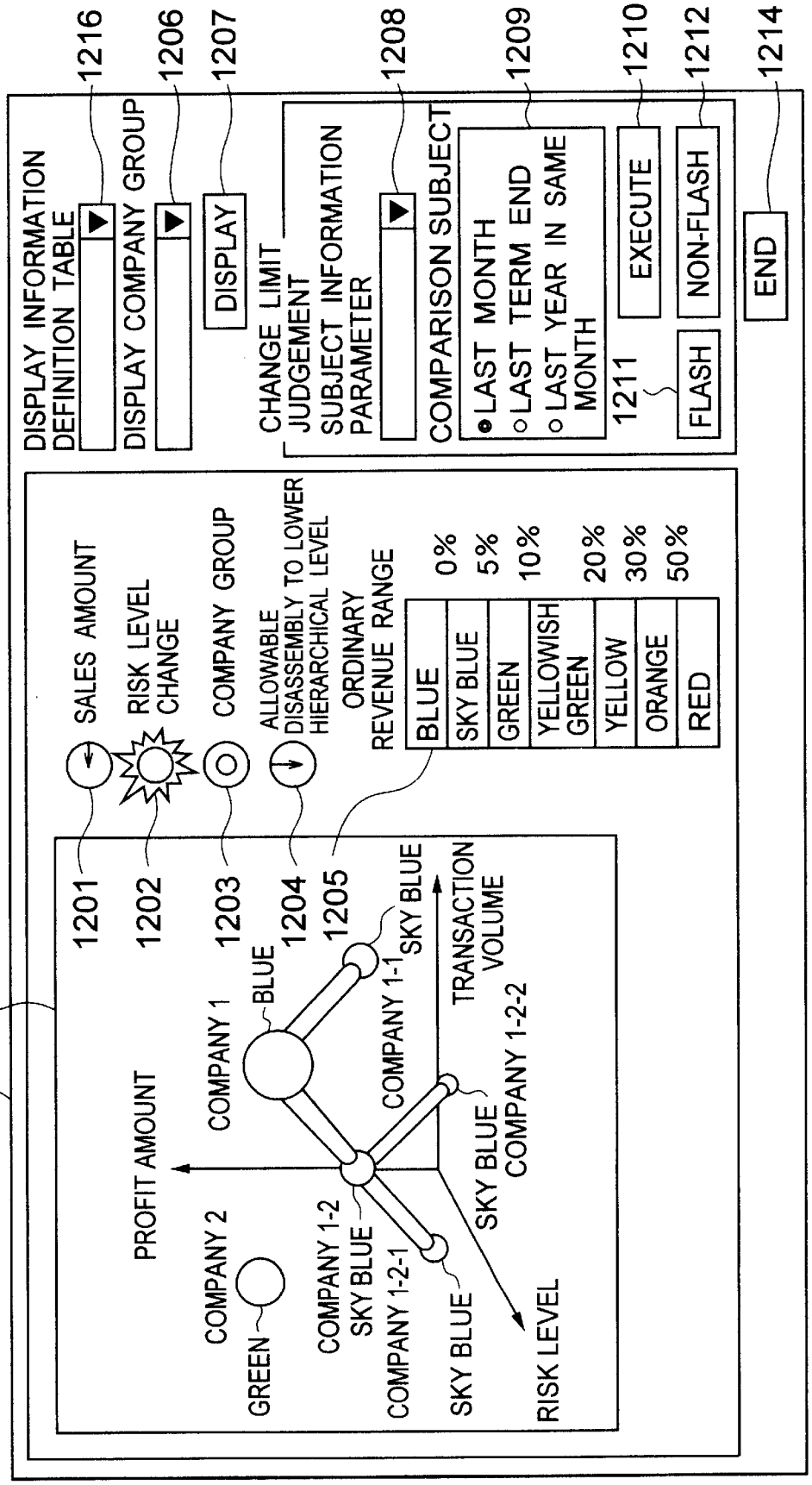
FIG. 13 is a diagram showing an example of a 3-D graphic display screen according to the embodiment.

FIG. 13 is a diagram showing an example of a 3-D graphic display screen according to the embodiment, on which various information parameters of companies and company groups each constituted of companies are displayed in 3-D representation.

An explanatory note 1201 represents the corresponding information 702 of the sphere radius of the display item 701. An explanatory note 1202 represents the corresponding information 702 of flash of the display item 701. An explanatory note 1203 indicates that a sphere having a nucleus 1302 to be described later is a company group. An explanatory note 1204 indicates that a sphere having an arrow symbol to be described later has an affiliated member. A bar 1205 indicates the corresponding information 702 of the sphere color of the display item 701, and the corresponding color 802 of the color range 801.

A display information definition table box 1216 has a function equivalent to a list box for selecting a table from a plurality of display information definition tables shown in FIG. 8, for display purpose. A display company group box 1206 has a function equivalent to a list box for selecting a display group to be displayed. Instead of the list box, the display company group box 1206 may be arranged to be capable of selecting a plurality of company groups.

A display button 1207 has a function equivalent to a command button for executing 3-D graphic display. A subject information box 1208 has a function equivalent to a list box for selecting one of the corresponding information parameters 702 of the display information definition table shown in FIG. 8 in order to indicate the change ratio of the displayed current value from the past reference value.

A comparison subject button 1209 has a function equivalent to an option button for selecting the type of a past reference value to be compared when the change ratio is calculated. An execution button 1210 has a function equivalent to a command button for executing a process of determining whether the change ratio exceeds the change limit value. A flash button 1210 reflects the result of the process of determining whether the change ratio exceeds the change limit value, i.e., it has a function equivalent to a command button for executing flash display. A non-flash button 1212 has a function equivalent to a command button for stopping the flash display. A 3-D graphic display screen 1213 displays in 3-D representation the corresponding information parameters of companies and company groups each constituted of companies.

An end button 1214 has a function equivalent to a command button for closing the 3-D graphic display screen. A 3-D graphic display dialog 1215 indicates the whole display image.

Figure 14:
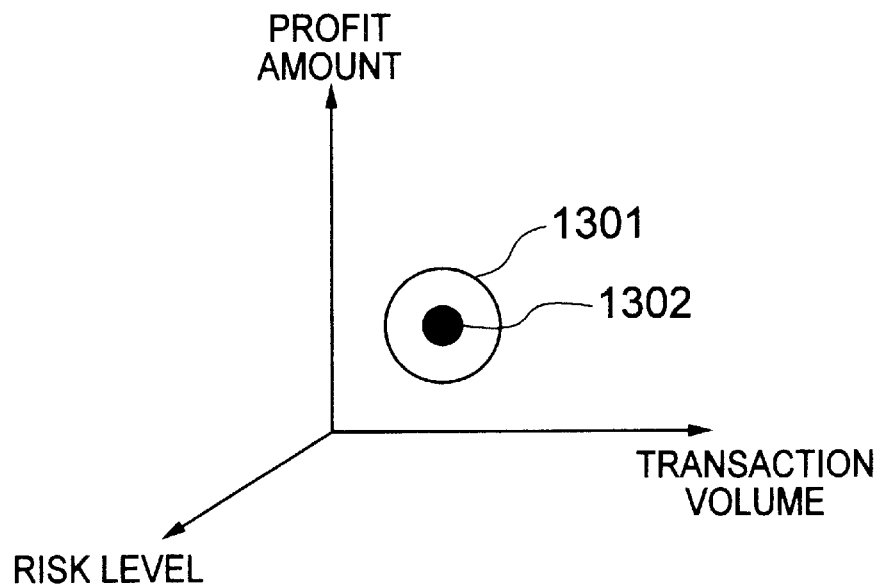
FIG. 14 is a diagram showing an example of the display of a sphere of a company group according to the embodiment.

FIG. 14 is a diagram showing an example of the display of a sphere of a company group according to the embodiment, which display on the 3-D graphic display screen 1213 discriminates between a company and a company group constituted of companies.

A display element 1301 is a sphere representing a company or a company group constituted of companies, the sphere having a radius corresponding to the contents of the corresponding information 702 of the "sphere radius" in the display item 701. In this example, a display element 1302 is a nucleus having the same center coordinates as those of the sphere and a radius of, for example, a half of that of the sphere. The sphere represented by the display element 1301 therefore corresponds to a company group.

Figure 15:
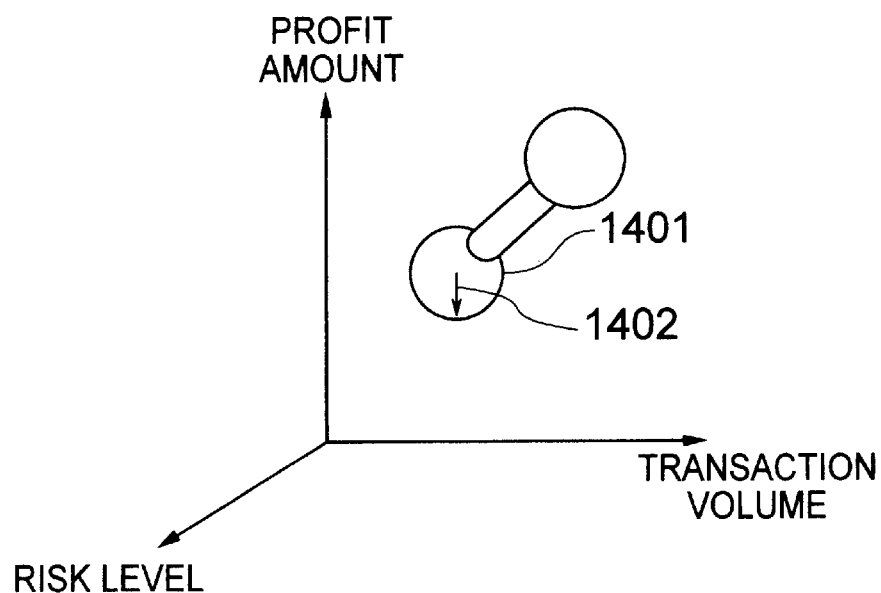
FIG. 15 is a diagram showing an example of the display indicating a presence of an affiliated member according to the embodiment.

FIG. 15 is a diagram showing an example of the display indicating a presence of an affiliated member according to the embodiment, which display on the 3-D graphic display screen 1213 indicates whether the company displayed in 3-D representation has an affiliated member.

A display element 1401 is a sphere representing a company, the sphere having a radius corresponding to the contents of the corresponding information 702 of the "sphere radius" in the display item 701. In this example, a display element 1402 is a downward arrow indicating that the company has an affiliated member or that the company represented by the display element 1401 has an affiliated member.

Figure 16:
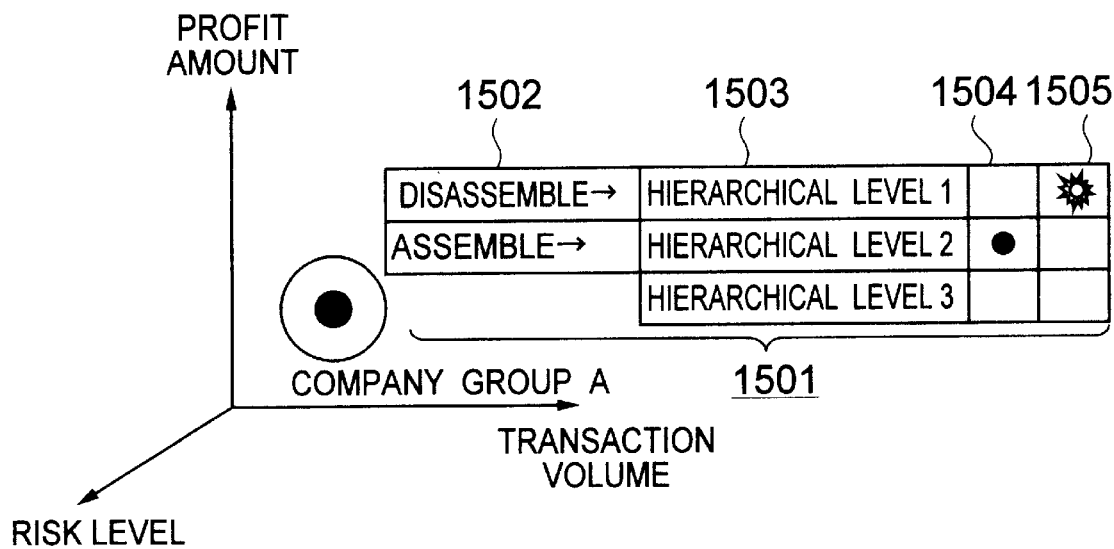
FIG. 16 is a graph showing an example of a disassembly process of disassembling a company group according to the embodiment.

FIG. 16 is a graph showing an example of a disassembly process of disassembling a company group on the 3-D graphic display screen 1213 into a plurality of companies constituting the company group, according to the embodiment.

A disassemble/assemble menu 1501 has a function equivalent to a pop-up menu which is displayed when the display element of the company group to be disassembled or assembled is, for example, clicked with a mouse.

A disassemble/assemble list 1502 is a list for designating a disassemble or assemble process. If the pointer of the mouse is moved to "disassemble →" of the disassemble/assemble list 1502 after the disassemble/assemble menu 1501 is displayed by selecting the display element of the company group to be disassembled, a hierarchical level list 1503, company group information 1504 and flash display subject information 1505 respectively corresponding to the disassemble process, are displayed. In this case, for example, if there is no affiliated member of the company group to be disassembled when the pointer of the mouse is moved to "disassemble →" of the disassemble/assemble list 1502, the disassemble process is disabled so as not to be designated.

A hierarchical level list 1503 is a list indicating to which hierarchical level the disassemble process is designated. The hierarchical level is represented by a sequential hierarchical level starting from the highest level company group. For example, only the levels lower than the level of the company group to be disassembled are activated so as to be designated.

Company group information 1504 is used for notifying whether there is a company group at each level of the hierarchical level list 1503.

Flash display subject information 1505 is used for notifying whether there is a company or a company group constituted of companies to be flashed, at each hierarchical level of the hierarchical level list 1503. It is assumed that both the company group information 1504 and flash display subject information 1505 are displayed. along with the hierarchical level list 1503.

Instead of a company group, a company having an affiliated member may be disassembled into a plurality of companies.

Figure 17:
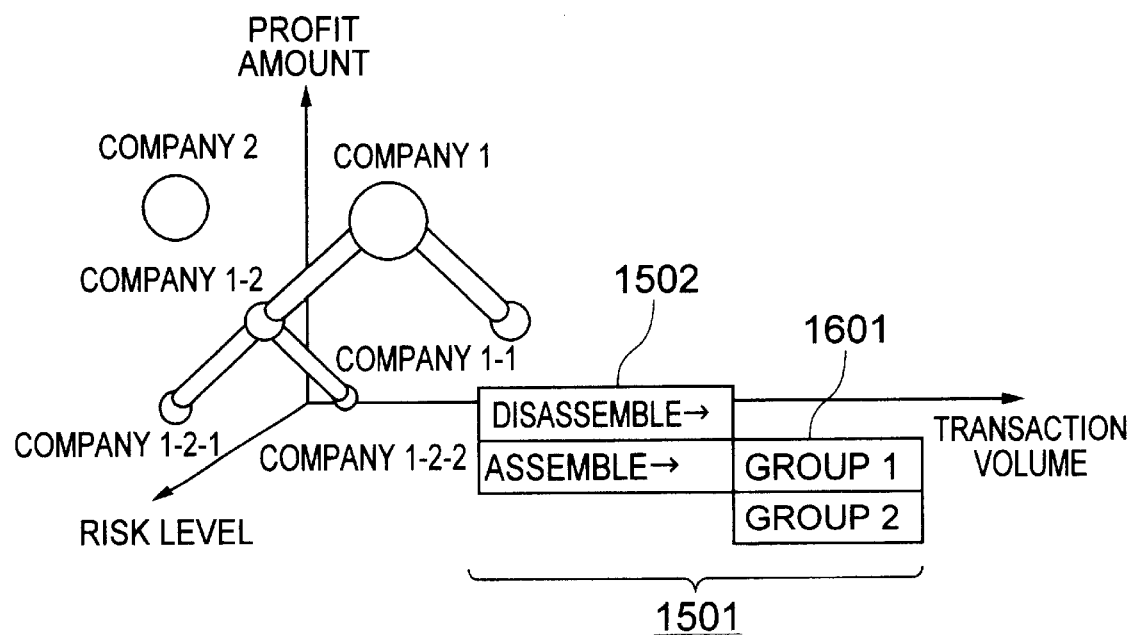
FIG. 17 is a graph showing an example of an assembly process of assembling companies or company groups according to the embodiment.

FIG. 17 is a graph showing an example of an assembly process of assembling a company or company group on the 3-D graphic display screen 1213 into a higher hierarchical level company group constituted of such companies or company groups.

After the disassemble/assemble menu 1501 is displayed by selecting the display element of a company or a company group with a mouse and if the pointer of the mouse is moved to "assemble →" of the disassemble/assemble list 1502, a group hierarchical level list 1601 corresponding to the assembly process is displayed. In this case, for example, if there is no higher hierarchical level company group of the company group to be assembled, when the pointer of the mouse is moved to "assemble →" of the disassemble/assemble list 1502, the assemble process is disabled so as not to be designated.

The group hierarchical level list 1601 is a list indicating to which higher hierarchical level the assemble is designated. The group hierarchical level is represented by a sequential hierarchical level starting from the highest hierarchical level company group. For example, only the group hierarchical levels higher than the hierarchical level of the company or company group to be assembled are activated so as to be designated.

The 3-D graphic display procedure of this embodiment is roughly classified into: a 3-D graphic display process of opening the 3-D graphic display dialog 1215 and displaying a 3-D graph on the 3-D graphic display screen 1213; a change limit judgement result display process of reflecting the change limit judgement result on the 3-D graphic display screen, i.e., re-displaying the 3-D graph after the 3-D graph is once displayed on the 3-D graphic display screen 1213; and a disassemble/assemble result display process of executing a disassemble process or assemble process on the 3-D graphic display screen 1213 and reflecting the disassemble or assemble result on the 3-D graphic display screen 1213, i.e., re-displaying the 3-D graph.

Figure 18:
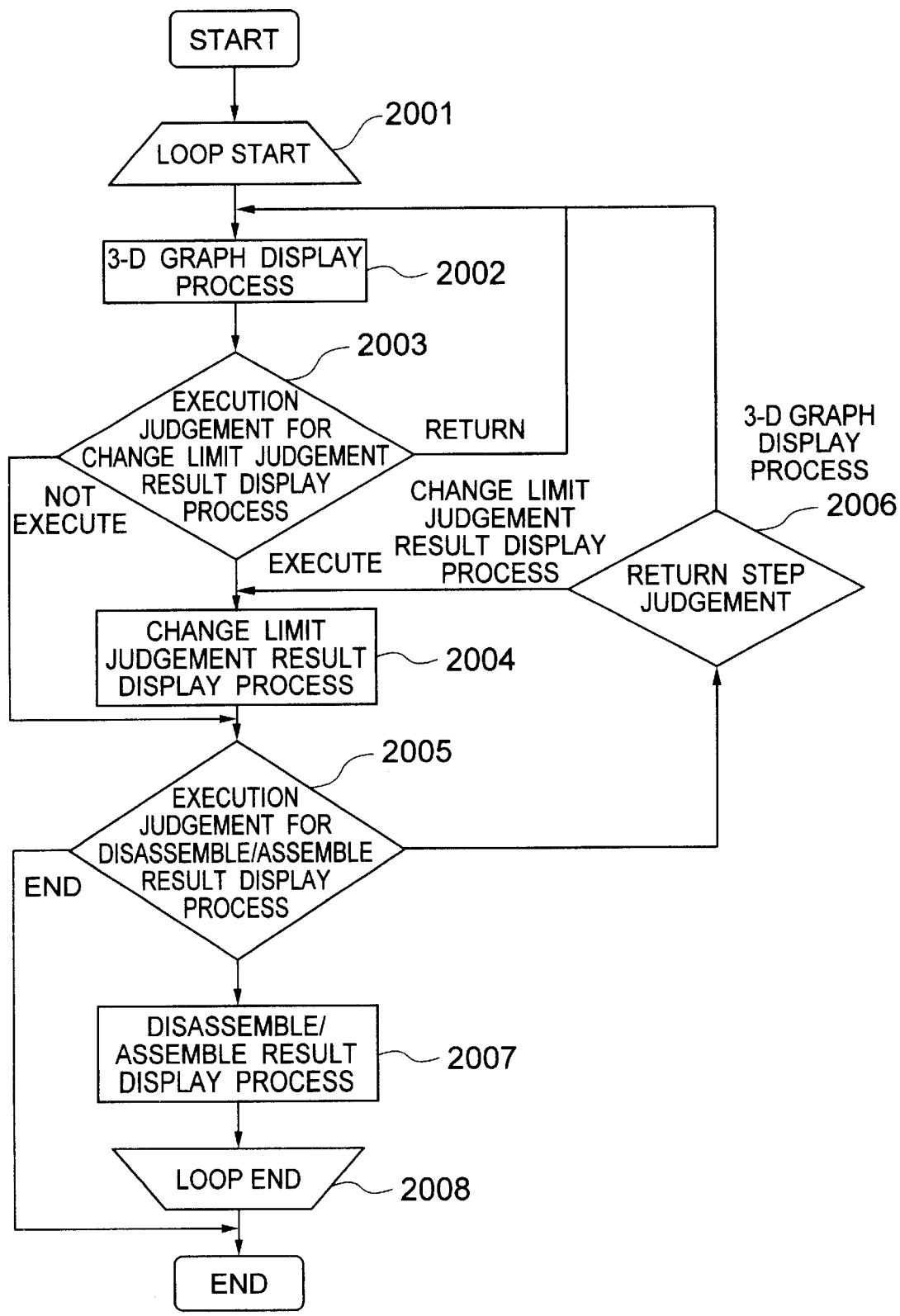
FIG. 18 is a flow chart illustrating the procedure to be executed by the graph displaying apparatus of the embodiment.

FIG. 18 is a flow chart illustrating the whole procedure of 3-D graph display to be executed by the graph displaying apparatus of the embodiment.

The graph displaying apparatus of the embodiment randomly executes, under the condition that the 3-D graph display dialog 1215 is opened, the 3-D graph display process at Step 2002, change limit judgement result display process at Step 2004 and disassemble/assemble result display process at Step 2007, during the routine process from a loop start at Step 2001 to a loop end at Step 2008. However, in this case, it is assumed that the change limit judgement result display process at Step 2004 and disassemble/assemble result display process at Step 2007 will not be executed unless the 3-D graph display process at Step 2002 is first executed.

When the loop process starts at Step 2001, the 3-D graph display process is executed at Step 2002. When the display button 1207 is depressed, a 3-D graph is displayed on the 3-D graph display screen 1213.

At Step 2003 for judging whether the change limit judgement result display process is to be executed, it is checked whether the execution button 1210 is depressed. If depressed, the flow advances to Step 2004 whereat the change limit judgement result display process is executed.

If the display button 1207 is depressed at Step 2003, the flow returns to Step 2002 whereat the 3-D graph is displayed on the 3-D graph display screen 1213. If a display element in the 3-D graph is selected with a mouse at Step 2003, the disassemble/assemble menu 1501 is displayed to thereafter advance to Step 2005.

At Step 2005 for judging whether the disassemble/assemble result display process is to be executed, it is checked whether the disassemble or assemble process is designated from the disassemble/assemble list 1502, to thereby judge whether the disassemble/assemble result display process is to be executed.

If the disassemble or assemble process is designated at Step 2005, the flow advances to Step 2007 whereat the disassemble/assemble result display process is executed. If the end button 1214 is depressed at Step 2005, the 3-D graph display procedure is terminated.

If the display button 1207 or change limit judgement execution button 1210 is depressed at Step 2005, the flow advances to Step 2006 whereat it is determined to execute either the 3-D graph display process or change limit judgement result display process.

If the display button 1207 is depressed, the determination result at Step 2006 makes the flow return to Step 2002 whereat the 3-D graph is displayed on the 3-D graph display screen 1213. If the change limit judgement execution button 1210 is depressed, the determination result at Step 2006 makes the flow advance to Step 2004 whereat the change limit judgement result display process is executed.

Figure 19:
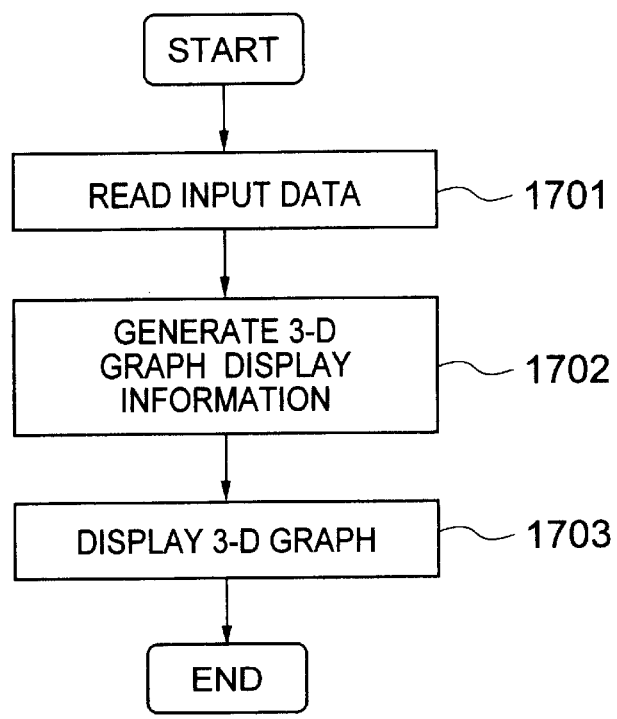
FIG. 19 is a flow chart illustrating the procedure of a 3-D graph display process according to the embodiment.

FIG. 19 is a flow chart illustrating the procedure of the 3-D graph display process according to the embodiment, the 3-D display process including from opening the 3-D graph display dialog 1215 to displaying the 3-D graph on the 3-D graph display screen 1213 by the system.

The individual display information generating unit 220 of the graph displaying apparatus of this embodiment assigns the information parameters, such as the transaction volume 502, profit volume 504, risk level 503 and sales amount 602, of the members 301 constituting the collection or company group such as group A and company 1, to the graph display attribute values such as the X, Y, Z values and sphere radius. This unit 220 then converts the information parameters such as the transaction volume 502, profit volume 504, risk level 503 and sales amount 602 of each constituent member, into the assigned display attribute values such as the X, Y and Z values and sphere radius.

When the process at Step 2002 starts, the individual display information generating unit 220 first opens the 3-D graph display dialog 1215. At this time, the 3-D graph as well as the icons 1201 to 1204 and the bar 1205 is not still displayed on the 3-D graph display screen 1213.

Next, a user designates the display information definition table from the display information definition box 1216 and the display company group from the display company group box 1206. It is assumed that the system manages table names listed up in the display information definition box 1216 and company group names listed up in the display company group box 1206. It is assumed herein that the display information definition table shown in FIG. 8 is designated as a list of the display information definition box 1216. It is also assumed that the group A of the affiliated company group 303 is designated from the display company group box 1206.

When the display button 1207 is, for example, clicked with a mouse, the individual display information generating unit 220 reads the member management table of FIG. 4, company affiliation information table of FIG. 5, member (company/group) transaction information table of FIG. 6, member (company/group) business information table of FIG. 7, display information definition table of FIG. 8 and color decision information table of FIG. 9 (Step 1701).

Next, the individual display information generating unit 220 acquires the values of all the corresponding information parameters 702 of the members 301 belonging to the group A of the affiliated company group 303, i.e., the investment ratios 403 from the company affiliation information table of FIG. 5, transaction volumes 502, risk levels 503 and profit volumes 504 from the member transaction information table of FIG. 6, sales amounts 602 and ordinary revenue rates 604 from the member business information table of FIG. 7.

Next, the acquired transaction volume 502, profit volume 504, risk level 503 and sales amount 602 are converted into the X, Y and Z values and sphere radius. Then, the information of the members 301 belonging to the group A and their members 302 and the company/group discrimination information 302 as well as the converted X, Y and X values and sphere radii are stored in the fields of the members 1001, company/group discrimination information 1002, X value 1003, Y value 1004, Z value 1005 and sphere radius 1006.

Next, the affiliation display information generating unit 222 of the embodiment converts the investment ratio 403 into the display attribute value of the display element coupling the member 401 and affiliated member 402 constituting the company group.

Specifically, the affiliation display information generating unit 222 converts the investment ratio 403 between the member 401 and its affiliated member 402 constituting the members 301 belonging to the group A, into the radius of the column coupling the two spheres representing the member 401 and affiliated member 402. Then, the information of the member 401 and affiliated member 402 and the converted column radius are stored in the fields of the member 1101, affiliated member 1102 and column radius 1103.

Next, it is judged whether the acquired ordinary revenue rate 604 belongs to which part of the color range 801, to thereby decide the corresponding color 802. This decision result is stored in the field of the sphere color 1007 (Step 1702).

Next, by referring to the 3-D graph display sphere table of FIG. 11 and 3-D graph display column information table of FIG. 12 and by using the X value 1003, Y value 1004, Z value 1005, sphere radius 1006 and sphere color 1007 of the group A which is the highest hierarchical company group of the members 1001, the graph displaying unit 221 displays a 3-D graph on the 3-D graph display screen 1213 along with the notes 1201, 1203, 1204, bar 1205 and the like.

In this example, although it is assumed that the group A is designated as a default, the hierarchical level to be displayed as a default may be defined in advance to display the default member. If the member 401 and affiliated member 402 are to be displayed as different spheres in accordance with the definition of the hierarchical level to be displayed as a default, the affiliation displaying unit 223 displays a column coupling the two spheres representing the member 401 and affiliated member 402 to thereby indicate affiliation between the members 401 and 402, in accordance with the information stored in the fields of the member 1101, affiliated member 402 and column radius 1103. It is assumed that a user can change the hierarchical level to be displayed as a default (Step 1703).

Figure 20:
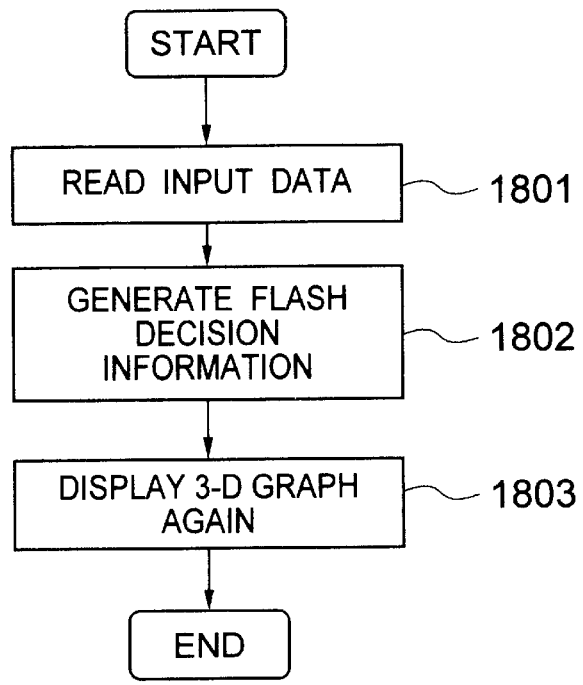
FIG. 20 is a flow chart illustrating the procedure of a change limit judgement result display process according to the embodiment.

FIG. 20 is a flow chart illustrating the procedure of the change limit judgement display process according to the embodiment, the change limit judgement result display process including reflecting the change limit judgement result on the 3-D graphic display screen 1213, i.e., re-displaying the 3-D graph after the 3-D graph is once displayed on the 3-D graphic display screen 1213 by the system.

The change limit judgement information generating unit 224 of this embodiment changes the display attribute value corresponding to the information parameter of each constituent member in accordance with a change in the information parameter. Specifically, in accordance with a change in the risk level 503 of the member 301, the sphere representing the member 301 is flashed.

First, a user designates the subject information parameter from the subject information parameter box 1208 and the comparison subject from the comparison subject button 1209. It is assumed that the information parameters listed up in the subject information parameter button 1208 are parameters of the corresponding information 702 corresponding to the five display items 701 including the X-, Y- and Z-coordinate values, sphere radius and sphere color. It is assumed that the risk level (change) of the Z-coordinate is designated as the subject information parameter.

Next, when the execution button 1210 is, for example, clicked with a mouse, the change limit judgement information generating unit 224 stores the risk level designated as the subject information parameter, in the field of the corresponding information 702 for flashing of the display item 701. Then, the change limit judgement information generating unit 224 reads the past risk level 503 of the last month, last term end, last year in the same month or the like corresponding to the comparison subject designated by the comparison subject button 1209, from the company/group transaction information table of FIG. 6, to thereafter refer to the flash decision information table of FIG. 10 (Step 1801).

Next, the change limit judgement information generating unit 224 judges whether the change ratio of the risk level 503 read at Step 1701 as the subject information parameter to the risk level 503 read at Step 1801 corresponds to which part of the flash decision range 901, to thereby determine the corresponding flash interval 902 which is stored in the field of the flash information 1008 (Step 1802). This Step is executed for all the members 301 belonging to the group A of the affiliated company group 303.

Next, when the flash button 1211 is, for example, clicked with the mouse, by referring to the 3-D graph display sphere table of FIG. 11, the change limit judgement result displaying unit 225 re-displays the 3-D graph of the member defined with the flash interval by the flash information 1008, on the 3-D graph display screen 1213, along with the note 1213. The non-flash button 1212 can be activated only while the member is flashed on the 3-D graph display screen 1213. When the user clicks the non-flash button 1212 with the mouse or the like, the flash display is stopped and the note 1202 is erased (Step 1803).

Figure 21:
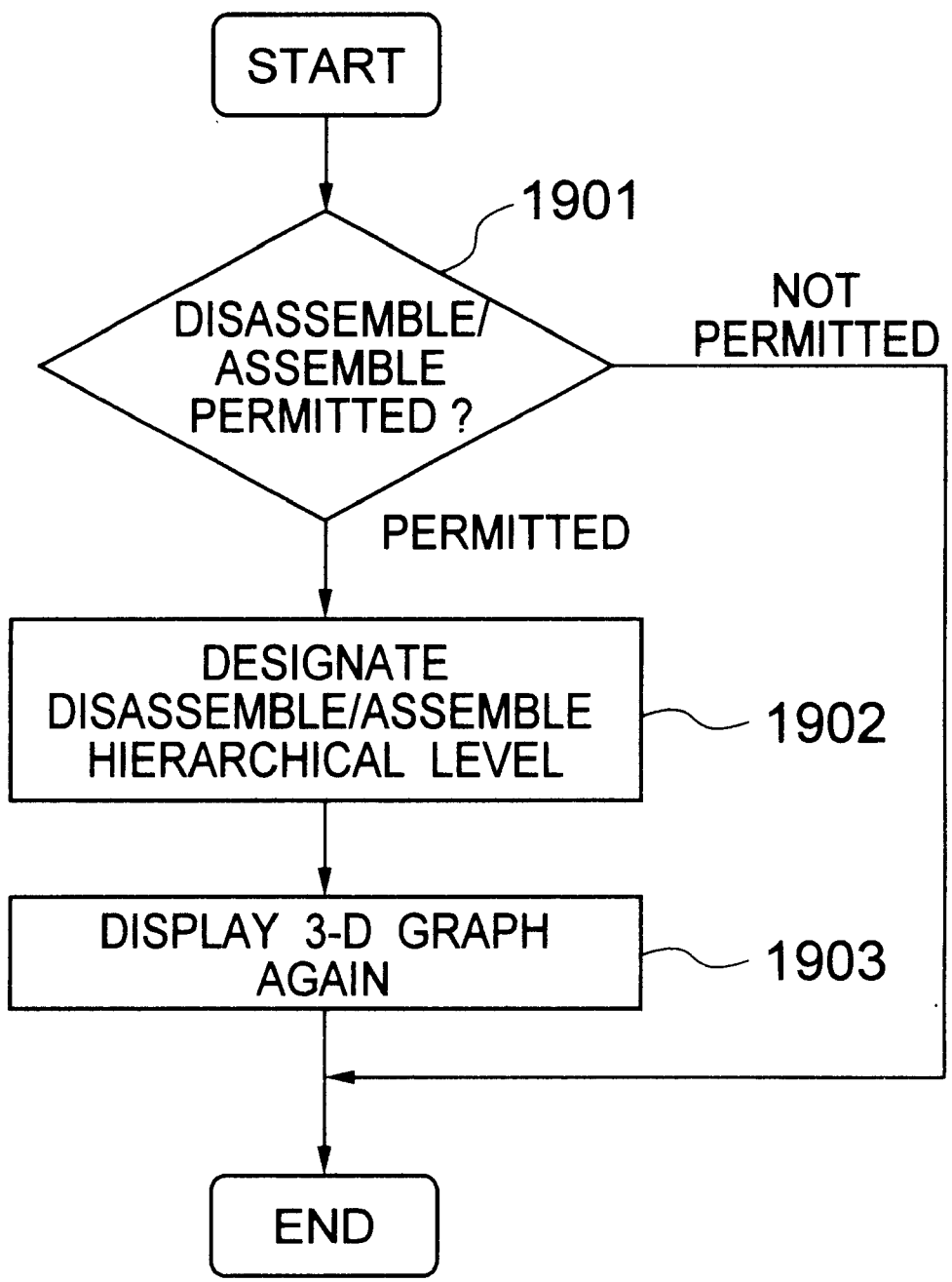
FIG. 21 is a flow chart illustrating the procedure of a disassemble/assemble result display process according to the embodiment.

FIG. 21 is a flow chart illustrating the procedure of the disassemble/assemble result display process according to the embodiment, the disassemble/assemble result display process including executing a disassemble/assemble process on the 3-D graph display screen 1213 by a user and reflecting the disassemble/assemble result on the screen 1213, i.e., re-displaying the 3-D graph.

First, the disassemble/assemble permission deciding unit 226 displays the disassemble/assemble list 1502 of the disassemble/assemble menu 1501 when the company or company group to be disassembled or assembled is clicked with the mouse or the like.

In this case, if the disassemble process is designated by the disassemble/assemble list 1502, the following operation is performed. The lowest hierarchical level of members whose levels are lower than the member 301 read at Step 1701 is compared with the member hierarchical level 304. If the lowest hierarchical level 306 is higher than the member hierarchical level 304 (if 306>304), then it is judged that the disassemble process is possible and activation or the like is performed so as to allow the disassemble process using the disassemble/assemble list 1502. If the lowest hierarchical level 306 is equal to the member hierarchical level 304 (if 306=304), then it is judged that the disassemble process is impossible and inactivation or the like is performed so as not to allow the disassemble process using the disassemble/assemble list 1502.

If the assemble process is designated by the disassemble/assemble list 1502, the following operation is performed. It is checked whether the affiliated company group number 305 is "0". If not (305 is not 0), then it is judged that the assemble process is possible and activation or the like is performed so as to allow the assemble process using the disassemble/assemble list 1502. If the affiliated company group number 305 is "0" (305=0), then it is judged that the assemble process is impossible and inactivation or the like is performed so as not to allow the assemble process using the disassemble/assemble list 1502 (Step 1901).

Next, when the pointer of the mouse is moved to "disassemble →" of the disassemble/assemble list 1502, the disassemble/assemble hierarchical level designating unit 227 displays the hierarchical level list 1503 to designate the hierarchical level upon operation of the mouse or the like.

If the company/group discrimination information 302 of the member 301 to be disassembled indicates a group, the disassemble/assemble hierarchical level designating unit 227 lists up the hierarchical levels from the member hierarchical level 304 to the lowest hierarchical level 306 of members, in the hierarchical level list 1503, whereas if the company/group discrimination information 302 of the member 301 to be disassembled indicates a company, the disassemble/assemble hierarchical level designating unit 227 lists up the hierarchical levels from the level one level lower than the member hierarchical level 304 to the lowest hierarchical level 306 of members, in the hierarchical level list 1503.

The disassemble/assemble hierarchical level designating unit 227 also checks from the member hierarchical level 304 and company/group discrimination information 302 whether there is a group at each of the hierarchical levels listed up in the hierarchical level list 1503. If there is a group, a mark is affixed to the field of the company group information 1504.

The disassemble/assemble hierarchical level designating unit 227 also checks from the flash information 1008 of the member 1001 corresponding to the member 301 whether the change limit judgement judges that the current value exceeds the past reference value at each of the hierarchical levels listed up in the hierarchical level list 1503. In the case other than no flash, a mark is affixed to the field of the flash display subject information 1505. If the change limit judgement is not executed and there is no flash information 1008, a mark is not affixed to the field of the flash display subject information 1505. By referring to the company group information 1504 and flash display subject information 1505, a user designates a hierarchical level to be disassembled, from those listed up in the hierarchical level list 1503.

When the pointer of the mouse is moved to "assemble →" of the disassemble/assemble list 1502, the disassemble/assemble hierarchical level designating unit 227 displays the group level list 1601 to designate the group level to be assembled upon operation of the mouse or the like. The group level list 1601 lists up groups including the group 1 at the highest hierarchical level and the groups corresponding in number to the affiliated company group number 305, e.g., if the number 305 is "2", the group 2. A user designates a group level to be assembled, from the group level list 1601 which lists up the groups (Step 1902).

Next, in accordance with the hierarchical level of the hierarchical level list 1503 or the group level of the group level list 1601 designated at Step 1902, the disassemble/assemble result displaying unit 228 derives the member 301 to be displayed, and re-displays the 3-D graph of the member 1001 corresponding to the derived member 301 on the 3-D graph display screen 1213, by referring to the 3-D graph display sphere table of FIG. 11 and 3-D graph display column table of FIG. 12 and by using the X value 1003, Y value 1004, Z value 1005, sphere radius 1006, sphere color 1007 and column radius 1103. If the flash display subject information 1505 indicates a flash, the sphere is flashed in accordance with the flash display subject information 1505 (Step 1903).

According to the embodiment, a person in charge of analysis of the transaction state between companies and company groups constituted of companies can easily grasp and confirm the information parameters related to the transactions between companies and company groups as well as a change ratio of a current value to a past reference value and information parameters defining correlation between transaction information parameters. For example, if a market risk, a credit risk and an operational risk, which represent profit rates (risk-profit rates) between profit amounts and risk levels both in a trade-off relation, are allocated to the X-, Y and Z axes and the diameter of a sphere is determined from these risk levels, these risk-profit rates can be visually grasped and confirmed.

In analyzing the profitability of each company and each company group constituted of companies, a company or company group having a high or low risk-profit rate among companies and company groups can be easily grasped and confirmed in accordance with the information parameters'related to the transactions among them. In evaluating the total profitability of a company group or in finding a company most contributing to the profitability, it is possible to visually grasp and confirm them by disassembling the information parameters of the transaction of the company group into information parameters of each company constituting the company group, or by assembling the information parameters of the transaction of each company into information parameters of the company group.

Furthermore, an information parameter defining the affiliation degree between companies and company groups, e.g., an investment ratio, can be visually grasped and confirmed in order to check the latent risk level of each company or company group which may influence other companies or company groups constituting a company network.

What is claimed is:

1. A graph displaying method for displaying as an analysis subject a collection of constituent members each having a plurality of information parameters, comprising the steps of:

assigning each information parameter of each constituent member to a display attribute of graphic representation, and converting a value of the information parameter of each constituent member into a value of the assigned display attribute;

providing a display corresponding to the information parameter of each constituent member by using the converted display attribute value;

converting a value of each information parameter indicating affiliation between constituent members into the display attribute value of a display element which couples display elements of the constituent members; and providing a display corresponding to the affiliation between the constituent members by using the converted display attribute value.

2. A graph displaying method for displaying as an analysis subject a collection of constituent members each having a plurality of information parameters, comprising the steps of:

assigning each information parameter of each constituent member to a display attribute of graphic representation, and converting a value of the information parameter of each constituent member into a value of the assigned display attribute;

providing a display corresponding to the information parameter of each constituent member by using the converted display attribute value;

changing the display attribute value corresponding to an information parameter of each constituent member in accordance with a change in the information parameter; and providing a display of the information parameter by using the changed display attribute value.

3. A graph displaying method for displaying as an analysis subject a collection of constituent members each having a plurality of information parameters, comprising the steps of:

assigning each information parameter of each constituent member to a display attribute of graphic representation, and converting a value of the information parameter of each constituent member into a value of the assigned display attribute;

providing a display corresponding to the information parameter of each constituent member by using the converted display attribute value;

judging whether the value of an information parameter of a selected constituent member can be disassembled or assembled;

designating a disassemble or assemble hierarchical level of the constituent member capable of being disassembled or assembled; and converting a value of the information parameter of the constituent member at the designated hierarchical level into the value of the assigned display attribute, and providing a display corresponding to the disassemble or assemble hierarchical level, by using the converted display attribute value.

4. A graph displaying apparatus for displaying as an analysis subject a collection of constituent members each having a plurality of information parameters, comprising:

an individual display information generating unit for assigning each information parameter of each constituent member to a display attribute of graphic representation, and converting a value of the information parameter of each constituent member into a value of the assigned display attribute;

a graph displaying unit for providing a display corresponding to the information parameter of each constituent member by using the converted display attribute value;

an affiliation display information generating unit for converting a value of each information parameter indicating affiliation between constituent members into the display attribute value of a display element which couples display elements of the constituent members; and an affiliation displaying unit for providing a display corresponding to the affiliation between the constituent members by using the converted display attribute value.

5. A graph displaying apparatus for displaying as an analysis subject a collection of constituent members each having a plurality of information parameters, comprising:

an individual display information generating unit for assigning each information parameter of each constituent member to a display attribute of graphic representation, and converting a value of the information parameter of each constituent member into a value of the assigned display attribute;

a graph displaying unit for providing a display corresponding to the information parameter of each constituent member by using the converted display attribute value;

a change limit judgement information generating unit for changing the display attribute value corresponding to an information parameter of each constituent member in accordance with a change in the information parameter; and a change limit judgement result displaying unit for providing a display of the information parameter by using the changed display attribute value.

6. A graph displaying apparatus for displaying as an analysis subject a collection of constituent members each having a plurality of information parameters, comprising:

an individual display information generating unit for assigning each information parameter of each constituent member to a display attribute of graphic representation, and converting a value of the information parameter of each constituent member into a value of the assigned display attribute;

a graph displaying unit for providing a display corresponding to the information parameter of each constituent member by using the converted display attribute value;

a disassemble/assemble permission deciding unit for judging whether the value of an information parameter of a selected constituent member can be disassembled or assembled;

a disassemble/assemble hierarchical level designating unit for designating a disassemble or assemble hierarchical level of the constituent member capable of being disassembled or assembled; and a disassemble/assemble result displaying unit for converting a value of the information parameter of the constituent member at the designated hierarchical level into the value of the assigned display attribute, and providing a display corresponding to the disassemble or assemble hierarchical level, by using the converted display attribute value.

7. A computer readable storage medium storing a program which makes a computer operate as a graph displaying apparatus for displaying as an analysis subject a collection of constituent members each having a plurality of information parameters, the program comprising:

an individual display information generating part for assigning each information parameter of each constituent member to a display attribute of graphic representation, and converting a value of the information parameter of each constituent member into a value of the assigned display attribute;

a graph displaying part for providing a display corresponding to the information parameter of each constituent member by using the converted display attribute value;

an affiliation display information generating part for converting a value of each information parameter indicating affiliation between constituent members into the display attribute value of a display element which couples display elements of the constituent members; and an affiliation displaying part for providing a display corresponding to the affiliation between the constituent members by using the converted display attribute value.

8. A computer readable storage medium storing a program which makes a computer operate as a graph displaying apparatus for displaying as an analysis subject a collection of constituent members each having a plurality of information parameters, the program comprising:

an individual display information generating part for assigning each information parameter of each constituent member to a display attribute of graphic representation, and converting a value of the information parameter of each constituent member into a value of the assigned display attribute;

a graph displaying part for providing a display corresponding to the information parameter of each constituent member by using the converted display attribute value;

a change limit judgement information generating part for changing the display attribute value corresponding to an information parameter of each constituent member in accordance with a change in the information parameter; and a change limit judgement result displaying part for providing a display of the information parameter by using the changed display attribute value.

9. A computer readable storage medium storing a program which makes a computer operate as a graph displaying apparatus for displaying as an analysis subject a collection of constituent members each having a plurality of information parameters, the program comprising:

an individual display information generating part for assigning each information parameter of each constituent member to a display attribute of graphic representation, and converting a value of the information parameter of each constituent member into a value of the assigned display attribute;

a graph displaying part for providing a display corresponding to the information parameter of each constituent member by using the converted display attribute value;

a disassemble/assemble permission deciding part for judging whether the value of an information parameter of a selected constituent member can be disassembled or assembled;

a disassemble/assemble hierarchical level designating part for designating a disassemble or assemble hierarchical level of the constituent member capable of being disassembled or assembled; and a disassemble/assemble result displaying part for converting a value of the information parameter of the constituent member at the designated hierarchical level into the value of the assigned display attribute, and providing a display corresponding to the disassemble or assemble hierarchical level, by using the converted display attribute value.

10. A program making a computer operate as a graph displaying apparatus for displaying as an analysis subject a collection of constituent members each having a plurality of information parameters, the program comprising:

an individual display information generating part for assigning each information parameter of each constituent member to a display attribute of graphic representation, and converting a value of the information parameter of each constituent member into a value of the assigned display attribute;

a graph displaying part for providing a display corresponding to the information parameter of each constituent member by using the converted display attribute value;

an affiliation display information generating part for converting a value of each information parameter indicating affiliation between constituent members into the display attribute value of a display element which couples display elements of the constituent members; and an affiliation displaying part for providing a display corresponding to the affiliation between the constituent members by using the converted display attribute value.

* * * * *